June 25, 1968   R. L. WHITE   3,390,306
DC CIRCUIT BREAKER INCLUDING COMPLEMENTARY FEEDBACK COUPLED
SOLID STATE DEVICES HAVING TRIGGERING MEANS
IN THE FEEDBACK CIRCUIT
Filed July 30, 1965   2 Sheets-Sheet 1

INVENTOR.
RICHARD L. WHITE
BY
ATTORNEYS

INVENTOR.
RICHARD L. WHITE
BY
ATTORNEYS

United States Patent Office 3,390,306
Patented June 25, 1968

1

3,390,306
DC CIRCUIT BREAKER INCLUDING COMPLEMENTARY FEEDBACK COUPLED SOLID STATE DEVICES HAVING TRIGGERING MEANS IN THE FEEDBACK CIRCUIT
Richard L. White, Paradise Valley, Ariz., assignor to Dickson Electronics Corporation
Filed July 30, 1965, Ser. No. 476,111
14 Claims. (Cl. 317—22)

ABSTRACT OF THE DISCLOSURE

A DC circuit breaker is provided having complementary transistors with base-to-collector connections to provide a feedback path. Gating means is inserted in the feedback path and may take the form of a third transistor for cutting off the first two transistors.

---

The present invention pertains to DC circuit breakers, and more particularly, to a solid state circuit breaker system for quickly and efficiently opening a circuit.

The many qualifications for a circuit breaker sometimes present design problems that require complex or cumbersome design. The breaker must, above all, be reliable since the equipment to which it is attached may possibly be very sensitive to excessive current and damage thereto very expensive. For example, the utilization of a DC circuit breaker in a data processing system dictates the use of a circuit breaker having a rapid response and completely reliable; however, in addition to these requirements, bulk and volume of the breaker become important as well as the reuseability of the breaker and the convenience with which it may be used, reused and/or replaced. Many designs may achieve all of these goals; however, the number of breakers necessary in a large electronic system may also dictate that the cost of each individual breaker be reduced to an absolute minimum to avoid the accumulative effect of a high-cost breaker resulting in equipment having an inordinate percentage of the total price representing the cost of the breakers.

Accordingly, it is an object of the present invention to provide a direct current circuit breaker that is physically small while nevertheless being reliable and having a long life.

It is another object of the present invention to provide a direct current circuit breaker utilizing the advantages to be gained through the use of solid state devices and inexpensively providing trip speeds faster than those available in circuit breakers of the prior art.

It is a further object of the present invention to provide a direct current circuit breaker that is not inductive and will not produce any radio frequency interference when interrupting the circuit in which it is connected.

Further objects and advantages of the present invention may become apparent to those skilled in the art as the description thereof proceeds. The invention, and the operation thereof, may more readily be described by reference to the accompanying drawings in which:

FIGURE 1 is a schematic circuit diagram of a DC circuit breaker useful in describing the operation of a DC circuit breaker not having the improvements of the present invention; the circuit diagram of FIGURE 1 represents a novel circuit described and claimed in patent application Ser. No. 357,253, filed Apr. 3, 1964, now Patent No. 3,313,985 by the present applicant and assigned to the same assignee as the present application.

FIGURE 2 is a schematic circuit diagram of a DC circuit breaker incorporating the teachings of the present invention.

2

Figure 1:
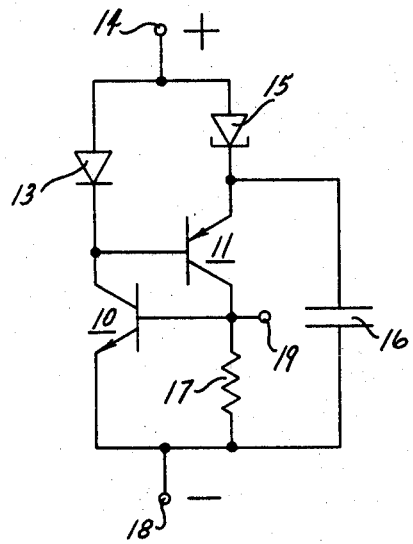

Referring to FIGURE 1, a schematic circuit diagram is shown of a DC circuit breaker. The circuit breaker of FIGURE 1 does not incorporate the teachings of the present invention but is described and claimed in patent application Ser. No. 357,253, filed Apr. 3, 1964, by the present applicant. A description of FIGURE 1 will facilitate understanding the improvements afforded by applicant's present invention. Referring to FIGURE 1, a pair of complementary transistors 10 and 11 (the former of the NPN type and the latter of the PNP type) are interconnected having their respective base electrodes connected to the collector electrode of the other. The collector electrode of transistor 10 is connected through a diode 13 to the relatively positive terminal 14 of the circuit breaker. A tunnel diode 15 also has its anode electrode connected to the terminal 14 and its cathode electrode connected to the emitter electrode of the transistor 11. A capacitor 16 is connected to the terminal 18 and to the emitter of transistor 11; the collector electrode of the transistor 11 is connected through a resistor 17 to a relatively negative terminal 18. The DC circuit breaker of FIGURE 1 is inserted in an electrical system in series with the load. The operation of the circuit of FIGURE 1 is described more completely in the above-noted co-pending application; however, to facilitate description of the present invention, a brief resume of the operation of the circuit of FIGURE 1 will be given. Current flowing through the load in the electrical system will normally flow from terminal 14 through the DC circuit breaker of FIGURE 1 to terminal 18. The current will follow a parallel path, the first portion flowing through the diode 13 and another portion flowing through the tunnel diode 15. The circuit breaker will continue to conduct the current in this manner and the bias provided to the transistor 11 by the diode 13 will assure a closed condition of the circuit breaker. The voltage drop exhibited by the circuit breaker is only the forward voltage drop of the diodes and the saturation voltage of the transistors; further, the components provide a very low power dissipation. If the load connected in series with the circuit breaker should fail and become short-circuited, the current surge caused by the load failure will be transmitted from the terminal 18 through the capacitor 16 to the cathode electrode of the tunnel diode 15. The sudden current increase will cause the tunnel diode to switch from the low voltage to the high voltage state thereby removing the forward bias on the transistor 11. When transistor 11 begins to shut off, a feedback process begins through the intercoupling of the transistors 10 and 11 which becomes cumulative and accelerates the rapid turnoff of both transistors. The circuit breaker has thus opened and the circuit between the terminals 14 and 18 has been interrupted. The circuit of FIGURE 1 thus provides the necessity of a compact reliable DC circuit breaker; however, there exists a singular disadvantage in that the circuit when switched to the off state, is only passively "off" and is not actively being held in the open-circuit condition. This shortcoming could have unfortunate consequences if, for example, the supply connected through the circuit breaker to the load is a low impedance supply. A short across the load circuit will turn off the supply voltage to the load as indicated above; however, the supply voltage will, after the circuit breaker has opened, exist across the capacitor 16. When the circuit breaker is reclosed such as by a pulse applied at terminal 19, the circuit breaker will switch to its on state. Since the capacitor 16 has been charged during the open condition, a repeated short circuit in the load will not result in the transmission of a corresponding pulse through the capacitor 16 and will thus not be accompanied by a repeated opening of the circuit. Accordingly, the improvement represented by the present invention is intended to obviate this difficulty and to further provide a means for the circuit breaker to automatically attempt to reclose the circuit in a manner designed to avoid damage to the connected load.

Figure 2:
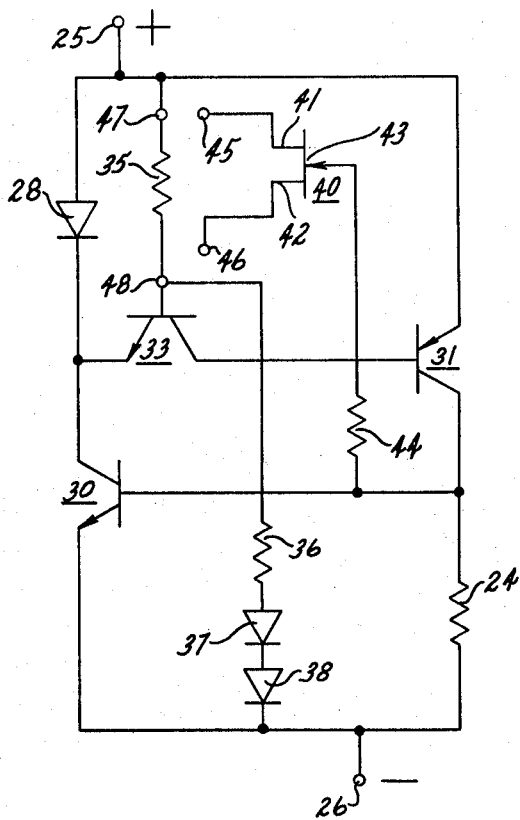

Referring to FIGURE 2, an improved DC circuit breaker is shown incorporating the teachings of the present invention. The circuit breaker includes terminals 25 and 26 designed to be connected in series with a power source and the load. A diode 28 is connected through its anode to the terminal 25 and by its cathode to the collector electrode of a transistor 30. The emitter electrode of the transistor 30 is connected to the terminal 26. A second and complementary transistor 31 is connected through its emitter electrode to the terminal 25 and is connected through its collector electrode and resistor 24 to the terminal 26. The transistors 30 and 31 are interconnected base-to-collector in a manner similar to FIGURE 1 with the following exception. A third transistor 33 is placed with its emitter-collector circuit in series with the connection between the base electrode of transistor 31 and the collector electrode of the transistors 30. The third transistor 33 includes a base electrode connection to the terminal 25 through a resistor 35. The base electrode is also connected to the terminal 26 through a resistor 36 and a pair of diodes 37 and 38.

The operation of the circuit of FIGURE 2 may be described as follows. If we assume that the circuit is in its conducting condition, current flows from the terminal 25 through the diode 28 and the collector-emitter circuit of transistor 30 to the terminal 26. Current also flows through the resistor 35 through the base electrode of the transistor 33 to the transistor 30. Transistor 33 is in collector saturation and the base emitter junction of the transistor 31 is forward biased and also drawing current. No current is flowing through resistor 36 because of the low voltage drop across the terminals 25 and 26 (the circuit breaker appearing substantially as a short circuit between the power supply and the load). In the event of a short circuit in the load, the potential drop across the terminals 25 and 26 will instantaneously be increased and the voltage drop then existing across the circuit breaker will be impressed on the diodes 37 and 38. Current will begin to flow through the diodes 37 and 38 through the resistors 35 and 36. The current flowing through the resistor 36 results in a decreased current through transistor 33 to the transistor 30. Transistor 33 is forced out of saturation and the drop across the emitter-collector circuit thereof begins to increase; the base current provided to the transistor 31 also begins to reduce and the regenerative action encountered results in a rapid switching to a non-conducting state of the circuit breaker or, in other words, a switching to the "open" state. The circuit breaker is held in its open or off condition by a reverse bias on the base electrode of the transistor 33. The open circuit current through the circuit breaker will be only that current flowing through the resistor 35, resistor 36, and diodes 37 and 38 which, in view of the ability to use high resistances for the resistor 36, will result in a current drain of only micro amps. The circuit may be reset by any of several techniques perhaps the most efficient of which would be the application of an appropriately poled pulse supplied to the base electrode of the transistor 31. It may be noted that the current required to trip the circuit breaker need not be a load short, any overload current above a predetermined magnitude will suffice.

An alternative to the connection of the base electrode of the transistor 33 such as described above, FIGURE 2 also reveals the utilization of a field-effect transistor. The use of diodes 37 and 38 and the resistors 35 and 36 provide a means for sensing the condition of the external circuits connected to the circuit breaker to initiate the turn-off action for the circuit breaker and maintain the circuit breaker in the tripped or open condition until reset. The field-effect transistor provides this same action. Referring to FIGURE 2, a field-effect transistor 40 is shown having a source electrode 41, a drain electrode 42, and a gate electrode 43. The source electrode 41 is connected to terminal 45 and the drain electrode is connected to terminal 46. To implement the alternative embodiment utilizing the field-effect transistor of FIGURE 2, the resistors 35 and 36, and the diodes 37 and 38 are removed from the circuit by disconnecting the same at terminals 47 and 48 and connecting the field-effect transistor into the circuit by connecting terminal 45 to terminal 47 and the terminal 46 to terminal 48. The gate electrode 43 of the field-effect transistor 40 is effectively connected to the terminal 26 through resistors 44 and 24. The operation of the circuit of FIGURE 2 using the field-effect transistor is similar to that described above. When the circuit is conducting, the field-effect transistor acts much in the same way as a linear resistor and the transistor 33 base electrode is connected to the terminal 25 and will be in collector saturation. When a short circuit current occurs in the load, the increase current flowing through the field-effect transistor 40 increases the resistance and thus increases the voltage drop across the transistor 40 and ultimately results in reduced base-emitter current in the transistor 33. The increase of the voltage drop increases the bias on the field-effect transistor thereby increasing its resistance further, causing a cumulative or regenerative action in the circuit breaker in a manner described previously. The circuit breaker is now held in its open condition with substantially no current flowing through the field-effect transistor. It is interesting to note that in the original embodiment of FIGURE 2, the circuit breaker is current locked to its open condition whereas, when utilizing the field-effect transistor, the circuit breaker is now voltage locked to its open condition.

Figure 3:
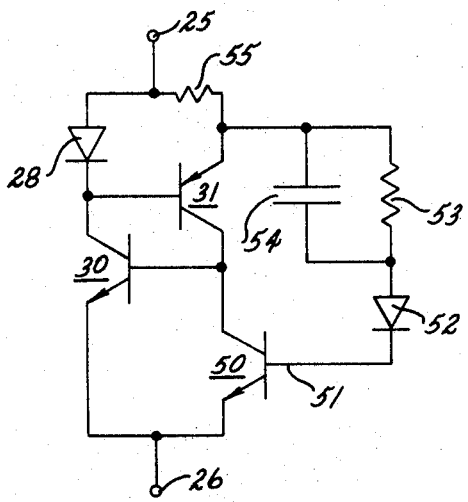
FIGURE 3 is a schematic circuit diagram of another DC circuit breaker incorporating the teachings of the present invention.

Referring to FIGURE 3, another embodiment of the circuit breaker of the present invention is shown. Transistors 30 and 31, as well as diode 28 and terminals 25 and 26, are identical to those utilized in FIGURE 2 and are identified by identical numerals. The voltage existing across the terminals 25 and 26 is utilized in FIGURE 3 to open the circuit through the expediency of a third transistor 50 having its emitter electrode connected to the terminal 26 and its collector electrode connected to the collector electrode of transistor 31. The base electrode 51 of the transistor 50 is connected through a diode 52 and a resistor 53 to the emitter electrode of transistor 31 (i.e., to the terminal 25). The resistor 53 is paralleled by a bypass capacitor 54. The operation of the circuit of FIGURE 3 may be described as follows. Assuming the circuit is conducting, current flows in a manner described in connection with the previous embodiments. Current flowing through transistors 30, 31 and diode 28 between the terminals 25 and 26 result in a very low voltage drop between the terminals 25 and 26 (essentially a short circuit). When a short circuit occurs in the load connected to the terminal 26, the voltage occurring at the terminal 26 will drop relative to the voltage present at the terminal 25. The increased voltage will appear across the emitter-base junction of the transistor 50 and across the diode 52 and the resistor 53. The increased voltage drop across the terminals 25 and 26 existing during any short circuit condition in the load connected to the terminal 26 will insure continued base-to-emitter current through the transistor. The current in the base of the transistor 50, when initiated, initiates a regenerative action through the base of transistor 30 causing the circuit breaker to assume its "open" condition; further, continued current through the base-emitter circuit of the transistor 50 clamps transistor 30 to its non-conducting state. The capacitor 54 is provided as a dynamic turn off element for transmitting transients caused by short circuiting of the load connected to the terminal 26 to insure rapid "opening" of the circuit breaker. The trip current may be controlled by selecting the value of resistor 55 since the voltage drop caused thereby will result in reduced current through transistor 31 thus instigating the turn-off action.

Figure 4:
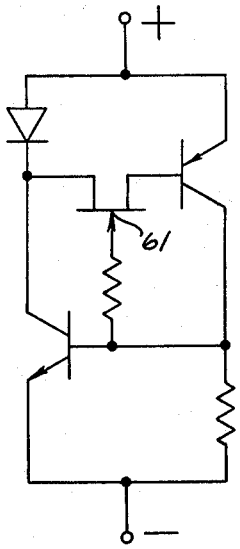
FIGURE 4 is a schematic circuit diagram of another embodiment of the present invention.

Referring to FIGURE 4, another embodiment of the present invention is shown. It may be seen by reference to FIGURE 4 that the major elements of the circuit are substantially the same as those discussed previously in connection with FIGURE 2; however, the field-effect transistor 61 has been substituted for the transistor 33 of FIGURE 2. The operation of the circuit of FIGURE 4 is obvious from the description previously given of the other figures and need not be explained in detail here. It will also be obvious that the circuit of FIGURE 4 may be modified in a manner similar to FIGURE 3 to provide the additional unique concept of automatic reclosing of the circuit breaker after tripping.

Figure 5:
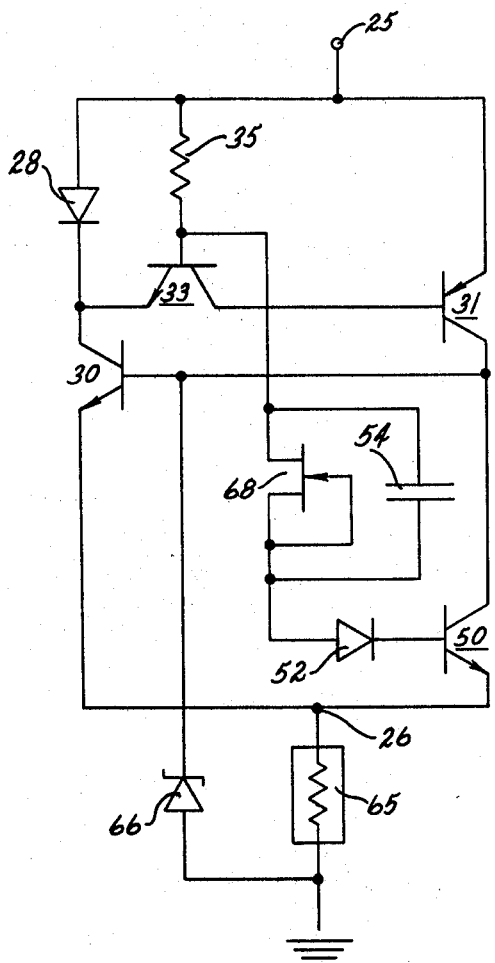
FIGURE 5 is a schematic circuit diagram of still another embodiment of the present invention.

Referring to FIGURE 5, another embodiment of the present invention is shown. The circuit diagram of FIGURE 5 represents a circuit including the teachings of the present invention but utilizing the features of both FIGURES 2 and 3 to present a higher current capacity circuit breaker having voltage as well as current sensitivity. The elements of FIGURE 5 corresponding to the elements of FIGURES 2 and 3 are numbered the same as in the latter figures. The circuit of FIGURE 5 includes the schematic representation of a load 65 connected to the terminal 26. A Zener diode 66 is connected between the low voltage side of the load 65 and the base electrode of the transistor 30. The transistor 50 is connected to the circuit in a manner similar to that of FIGURE 3 with the exception that a field-effect transistor 68 is used instead of the resistor 53 of FIGURE 3. The drain electrode of the field-effect transistor 68 is connected through the diode 52 to the base electrode of the transistor 50. The source electrode of the field-effect transistor is connected to the terminal 25 through the resistor 35 and to the base of the transistor 33, and the field-effect transistor is connected in the drain-to-gate configuration. The operation of the circuit of FIGURE 5 corresponds to the operation of FIGURES 2 and 3 with the addition of the voltage sensing function of the Zener diode 66. In the event of an overvoltage, sensed between the base electrode of the transistor 30 and the low voltage side of the load 65, the Zener voltage will begin conducting thus draining some of the current from the base electrode of the transistor 30. The current drain instigates the regenerative action mentioned previously and causes a rapid shutoff of the current flowing through the transistor 30 and thus opening the circuit breaker. The circuit of FIGURE 5 provides a compact, rapid-opening inexpensive DC circuit breaker presenting an unusually high current capacity for solid state elements.

It will be obvious to those skilled in the art that many modifications may be made in the circuit concepts of the present invention without departing from the spirit of the invention. Accordingly, it is intended that the present invention be limited only by the spirit and scope of the claims appended hereto.

I claim:
1. A DC circuit breaker comprising: a first and a second terminal; a unidirectional conducting device having first and second electrodes, said first electrode connected to said first terminal; a first transistor having a collector electrode connected to the second electrode of said unidirectional conducting device, an emitter electrode connected to said second terminal, and a base electrode; a second transistor having an emitter electrode connected to said first terminal, a collector electrode connected to said second terminal, and a base electrode; means connecting the base electrode of said first transistor to the collector electrode of said second transistor; a third transistor having an emitter electrode connected to the collector electrode of said first transistor, a collector electrode connected to the base electrode of said second transistor, and a base electrode; means including a resistor connecting the base electrode of said third transistor to said first terminal; and means connected to the base electrode of said third transistor responsive to a voltage between said first and second terminals for gating said third transistor off.

2. A DC circuit breaker comprising: a first and a second terminal; a unidirectional conducting device having first and second electrodes, said first electrode connected to said first terminal; a first transistor having a collector electrode connected to the second electrode of said unidirectional conducting device, an emitter electrode connected to said second terminal, and a base electrode; a second transistor having an emitter electrode connected to said first terminal, a collector electrode connected to said second terminal, and a base electrode; means connecting the base electrode of said first transistor to the collector electrode of said second transistor; a third transistor having an emitter electrode connected to the collector electrode of said first transistor, a collector electrode connected to the base electrode of said second transistor, and a base electrode; means including a resistor connecting the base electrode of said third transistor to said first terminal; and a resistor and a diode connected in series between the base electrode of said third transistor and said second terminal.

3. A DC circuit breaker comprising: a first and a second terminal; a unidirectional conducting device having first and second electrodes, said first electrode connected to said first terminal; a first active circuit element having a current path between first and second electrodes thereof, and having a control electrode, the first electrode thereof connected to the second electrode of said unidirectional conducting device, and the second electrode thereof connected to said second terminal; a second active circuit element having a current path between first and second electrodes thereof, and having a control electrode, the second electrode thereof connected to said first terminal, and the first electrode thereof connected to said second terminal; means connecting the control electrode of said first active circuit element to the first electrode of said second active circuit element; a third active circuit element having a current path between first and second electrodes thereof, and having a control electrode, the second electrode thereof connected to the first electrode of said first active circuit element, and the first electrode thereof connected to the control electrode of said second active circuit element; means including a resistor connecting the control electrode of said third active circuit element to said first terminal; and means connected to the control electrode of said third active circuit element responsive to a voltage between said first and second terminals for gating said third active circuit element to the non-conducting state.

4. A DC circuit breaker comprising: a first and a second terminal; a unidirectional conducting device having first and second electrodes, said first electrode connected to said first terminal; a first active circuit element having a current path between first and second electrodes thereof, and having a control electrode, the first electrode thereof connected to the second electrode of said unidirectional conducting device, and the second electrode thereof connected to said second terminal; a second active circuit element having a current path between first and second electrodes thereof, and having a control electrode, the second electrode thereof connected to said first terminal, and the first electrode thereof connected to said second terminal; means connecting the control electrode of said first active circuit element to the first electrode of said second active circuit element; a third active circuit element having a current path between first and second electrodes thereof, and having a control electrode, the second electrode thereof connected to the first electrode of said first active circuit element, and the first electrode thereof connected to the control electrode of said second active circuit element; means including a resistor connecting the control electrode of said third active circuit element to said first terminal; and a resistor and a diode connected in series between the control electrode of said third active circuit element and said second terminal.

5. A DC circuit breaker comprising: a pair of complementary transistors connected in a feedback arrangement with base electrodes of each connected to collector electrodes of the other; means connecting the collector electrode of the first of said transistors to a first terminal through a diode; means connecting the emitter electrode of the second of said transistors to said first terminal; means connecting the emitter electrode of the first transistor and the collector electrode of the second transistor to a second terminal; a controllable current-conducting element, including a control electrode, connected in series in the current path between the base electrode of the second transistor and collector electrode of the first transistor; and means connected to said control electrode responsive to a voltage between said first and second terminals for gating said controllable current-conducting element to the nonconducting state, said means connected to said first terminal.

6. A DC circuit breaker comprising: a pair of complementary transistors connected in a feedback arrangement with base electrodes of each connected to collector electrodes of the other; means connecting the collector electrode of the first of said transistors to a first terminal through a diode; means connecting the emitter electrode of the second of said transistors to said first terminal; means connecting the emitter electrode of the first transistor and the collector electrode of the second transistor to a second terminal; a controllable current-conducting element, including a control electrode, connected in series in the current path between the base electrode of the second transistor and collector electrode of the first transistor; and a field effect transistor having a source electrode connected to said first terminal, a drain electrode connected to said control electrode, and a gate electrode connected through a resistor to said second terminal.

7. A DC circuit breaker comprising: a pair of complementary transistors connected in a feedback arrangement with base electrodes of each connected to collector electrodes of the other; means connecting the collector electrode of the first of said transistors to a first terminal through a diode; means connecting the emitter electrode of the second of said transistors to said first terminal; means connecting the emitter electrode of the first transistor to a second terminal; a third transistor having an emitter connected to said second terminal and a collector connected to the emitter electrode of said second transistor, and having a base electrode; and means connecting the base electrode of said third transistor to said first terminal.

8. A DC circuit breaker comprising: a pair of complementary transistors connected in a feedback arrangement with base electrodes of each connected to collector electrodes of the other; means connecting the collector electrode of the first of said transistors to a first terminal through a diode; means connecting the emitter electrode of the second of said transistors to said first terminal; means connecting the emitter electrode of the first transistor to a second terminal; a third transistor having an emitter connected to said second terminal and a collector connected to the emitter electrode of said second transistor, and having a base electrode; and means connecting the base electrode of said third transistor to one electrode of a unidirectional conducting device, and means connecting another electrode of said unidirectional conducting device to said first terminal.

9. A DC circuit breaker comprising: a pair of complementary transistors connected in a feedback arrangement with base electrodes of each connected to collector electrodes of the other; means connecting the collector electrode of the first of said transistors to a first terminal through a diode; means connecting the emitter electrode of the second of said transistors to said first terminal; means connecting the emitter electrode of the first transistor to a second terminal; a third transistor having an emitter connected to said second terminal and a collector connected to the emitter electrode of said second transistor, and having a base electrode; and means connecting the base electrode of said third transistor to one electrode of a unidirectional conducting device, and means connecting another electrode of said unidirectional conducting device to one electrode of a resistor and to one electrode of a capacitor, means connecting another electrode of said resistor and capacitor to said first terminal.

10. A DC circuit breaker comprising: a first and a second terminal; a unidirectional conducting device having first and second electrodes, said first electrode connected to said first terminal; a first transistor having a collector electrode connected to the second electrode of said unidirectional conducting device, an emitter electrode connected to said second terminal, and a base electrode; a second transistor having an emitter electrode connected to said first terminal, and having a collector electrode and a base electrode; means connecting the base electrode of said first transistor to the collector electrode of said second transistor; a third transistor having an emitter electrode connected to the collector electrode of said first transistor, a collector electrode connected to the base electrode of said second transistor, and a base electrode; means including a resistor connecting the base electrode of said third transistor to said first terminal; a fourth transistor having a collector electrode connected to the collector electrode of said second transistor, an emitter electrode connected to said second terminal; and means connecting the base electrodes of said third and fourth transistors.

11. A DC circuit breaker comprising; a first and a second terminal; a unidirectional conducting device having first and second electrodes, said first electrode connected to said first terminal; a first transistor having a collector electrode connected to the second electrode of said unidirectional conducting device, an emitter electrode connected to said second terminal, and a base electrode; a second transistor having an emitter electrode connected to said first terminal, and having a collector electrode and a base electrode; means connecting the base electrode of said first transistor to the collector electrode of said second transistor; a third transistor having an emitter electrode connected to the collector electrode of said first transistor, a collector electrode connected to the base electrode of said second transistor, and a base electrode; means including a resistor connecting the base electrode of said third transistor to said first terminal; a fourth transistor having a collector electrode connected to the collector electrode of said second transistor, an emitter electrode connected to said second terminal; and means including a diode connecting the base electrodes of said third and fourth transistors.

12. A DC circuit breaker comprising: a first and a second terminal; a unidirectional conducting device having first and second electrodes, said first electrode connected to said first terminal; a first transistor having a collector electrode connected to the second electrode of said unidirectional conducting device, an emitter electrode connected to said second terminal, and a base electrode; a second transistor having an emitter electrode connected to said first terminal, and having a collector electrode and a base electrode; means connecting the base electrode of said first transistor to the collector electrode of said second transistor; a third transistor having an emitter electrode connected to the collector electrode of said first transistor, a collector electrode connected to the base electrode of said second transistor, and a base electrode;

means including a resistor connecting the base electrode of said third transistor to said first terminal; a fourth transistor having a collector electrode connected to the collector electrode of said second transistor, an emitter electrode connected to said second terminal; and a parallel circuit comprising a capacitor and the drain and source electrodes of a field-effect transistor, means connecting said parallel circuit in series with a diode between the base electrodes of said third and four transistors.

13. A DC circuit breaker comprising: a first and a second terminal; a unidirectional conducting device having first and second electrodes, said first electrode connected to said first terminal; a first transistor having a collector electrode connected to the second electrode of said unidirectional conducting device, an emitter electrode connected to said second terminal, and a base electrode; a second transistor having an emitter electrode connected to said first terminal, and having a collector electrode and a base electrode; means connecting the base electrode of said first transistor to the collector electrode of said second transistor; a third transistor having an emitter electrode connected to the collector electrode of said first transistor, a collector electrode connected to the base electrode of said second transistor, and a base electrode; means including a resistor connecting the base electrode of said third transistor to said first terminal; a fourth transistor having a collector electrode connected to the collector electrode of said second transistor, an emitter electrode connected to said second terminal; and a load connected to said second terminal, a Zener diode connected to a side of the load remote from said second terminal and connected to the base electrode of said first transistor.

14. A DC circuit breaker comprising: a first and a second terminal; a unidirectional conducting device having first and second electrodes, said first electrode connected to said first terminal; a first transistor having a collector electrode connected to the second electrode of said unidirectional conducting device, an emitter electrode connected to said second terminal, and a base electrode; a second transistor having an emitter electrode connected to said first terminal, and having a collector electrode and a base electrode; means connecting the base electrode of said first transistor to the collector electrode of said second transistor; a third transistor having an emitter electrode connected to the collector electrode of said first transistor, a collector electrode connected to the base electrode of said second transistor, and a base electrode; means including a resistor connecting the base electrode of said third transistor to said first terminal; a fourth transistor having a collector electrode connected to the collector electrode of said second transistor, an emitter electrode connected to said second terminal; a parallel circuit comprising a capacitor and the drain and source electrodes of a field-effect transistor, means connecting said parallel circuit in series with a diode between the base electrodes of said third and fourth transistors; and a load connected to said second terminal, a Zener diode connected to a side of the load remote from said second terminal and connected to the base electrode of said first transistor.

References Cited

UNITED STATES PATENTS

| | | | |
|---|---|---|---|
| 3,026,469 | 3/1962 | Wilbur et al. | 317—33 |
| 3,182,246 | 5/1965 | Lloyd | 317—33 |
| 3,218,542 | 11/1965 | Taylor | 323—22 |
| 3,234,453 | 2/1966 | Klees et al. | 323—22 |
| 3,313,985 | 4/1967 | White | 317—33 |

LEE T. HIX, *Primary Examiner.*

R. V. LUPO, *Assistant Examiner.*